United States Patent [19]

Kaufeldt

[11] 4,319,864

[45] Mar. 16, 1982

[54] APPARATUS FOR PRODUCING RAPID MOVEMENT AND SMOOTH BRAKING AND A PRECISELY DEFINED FINAL POSITION OF A MOVABLE ROBOT ARM

[76] Inventor: Roland Kaufeldt, Bovägen 6, S-135 00 Tyresö, Sweden

[21] Appl. No.: 122,369

[22] Filed: Feb. 19, 1980

[30] Foreign Application Priority Data

Feb. 21, 1979 [SE] Sweden ............................. 7901531

[51] Int. Cl.³ .............................................. B25J 11/00
[52] U.S. Cl. .................................... 414/750; 318/163; 414/751
[58] Field of Search ................................ 414/749–753; 198/577, 858, 859; 318/627, 163, 593, 39

[56] References Cited

U.S. PATENT DOCUMENTS

| | | | |
|---|---|---|---|
| 3,323,030 | 5/1967 | Inaba et al. | 318/593 |
| 3,820,667 | 6/1974 | Critchlow et al. | 414/752 |
| 3,995,206 | 11/1976 | Aronstein et al. | 318/593 |

OTHER PUBLICATIONS

Johnson et al., IBM Tech. Disclosure Bulletin, vol. 23, No. 6, pp. 2358–2359, 11/1980.

*Primary Examiner*—Trygve M. Blix
*Assistant Examiner*—Terrance L. Siemens
*Attorney, Agent, or Firm*—Laff, Whitesel, Conte & Saret

[57] ABSTRACT

A method and an apparatus for producing rapid movement and smooth braking and a precisely defined final position of a movable robot arm. For moving the robot arm from a first operative position to a second operative position the robot arm is first driven by a rapidly rotating motor until it comes close to its second operative position, at which time a slowly rotating motor with an associated coupling takes over the drive and reduces the driving speed of the robot arm progressively. When the robot arm reaches its final position a brake is actuated so as to clamp said robot arm.

2 Claims, 3 Drawing Figures

APPARATUS FOR PRODUCING RAPID MOVEMENT AND SMOOTH BRAKING AND A PRECISELY DEFINED FINAL POSITION OF A MOVABLE ROBOT ARM

BACKGROUND OF THE INVENTION

1. Field of the Invention

This invention refers to a method and an apparatus for producing rapid movement and smooth braking as well as precise final positions of a movable robot arm. When the robot is in use, the robot arm is capable of being set into a plurality of positions successively, with said rapid movement, smooth braking, and precise final position being achieved in each individual position into which the arm is set.

2. Description of the Prior Art

When robot arms are utilized in industry, the intention is that a tool or an object, respectively, located at one end of the robot arm, is to be capable of performing predetermined operations when the arm is disposed in different longitudinal displacement positions. The robot arm must be able to move rapidly between these positions and to stop smoothly at each position, as braking of impact type causes poor precision with regard to positioning and uncertain reproducibility. The robot arm has a certain weight in itself, and the tool or object, respectively, at its end may also be heavy. In order to produce rapid movement and smooth braking as well as high reproducibility of the final position it is basically necessary to solve the problem of rapidly and progressively reducing the level of the kinetic energy of the robot arm, tool and object.

In utilizing one or two end positions of a device driving the robot arm, for example one or both of the end positions of a hydraulic cylinder, with the robot arm being set into this end position or these end positions, no difficulties arise, but if the robot arm is to be stopped at a plurality of intermediate positions it becomes very difficult to achieve good reproducibility and concurrent smooth braking.

SUMMARY OF THE INVENTION

The present invention has the purpose of solving the mentioned problem with respect to reiterating into different, arbitrary positions, and the means by which this is achieved are defined in the accompanying claims. Basically the mentioned problem is solved by the invention by reducing the speed of the robot arm and thereby reducing the mass forces at the end of the movement of the robot arm in each individual case, i.e. immediately before the robot arm stops, which latter can be made to occur at an arbitrarily selected point along the robot arm.

BRIEF DESCRIPTION OF THE DRAWING

The invention will be described more specifically in the following with reference to the accompanying drawing in which.

DESCRIPTION OF THE PREFERRED EMBODIMENTS

Figure 1:
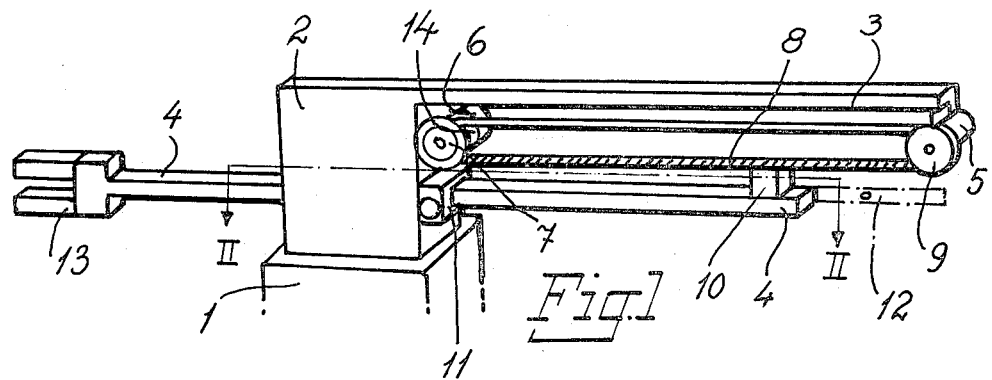
FIG. 1 shows a perspective view of an apparatus comprising an embodiment of the invention.

FIG. 1 shows a block 2 supported on a base 1, with a projecting arm 3 being integral with said block 2. The block 2 is provided with an opening through which a robot arm 4 can move longitudinally. The intention is that the left end (in FIG. 1) of robot arm 4 is to be provided with an appropriate tool which is illustrated as a hand 13.

At its outer end the projecting arm 3 carries a rapidly rotating motor 5, and at its inner end, i.e. close to block 2, it carries a slowly rotating motor 6. A coupling 14 is associated with said motor 6, and in the illustrated embodiment said coupling terminates with a gear 7, around which runs a gear belt or chain 8 which also runs around a gear 9 on the rapidly rotating motor 5. A block 10 is integrally associated with gear belt 8 and with robot arm 4, and when gear belt 8 is displaced longitudinally in one direction or the other block 10 and robot arm 4 will follow along in this motion. A brake 11, which may be electrically, hydraulically, or pneumatically actuable, can when actuated clamp robot arm 4 into an arbitrary, defined position.

A stationary arm 12 is located below the projecting arm 3, and robot arm 4 moves parallel to said stationary arm 12 in its longitudinal motion. The stationary arm 12 is provided with a number of transmitters A-E in definite but arbitrarily selected positions. These transmitters are adjustable longitudinally of the stationary arm 12. A sensor G is fixedly mounted on the movable robot arm 4 for cooperating with said transmitters A-E.

Figure 2:
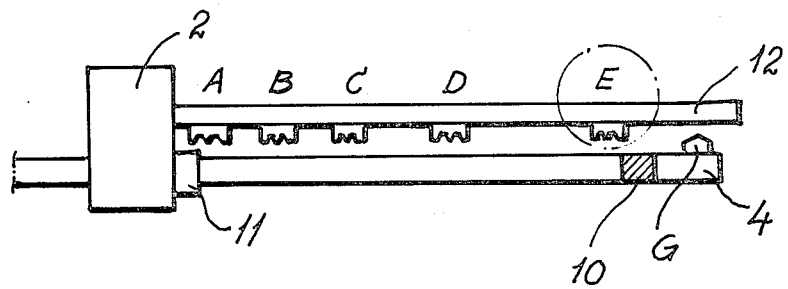
FIG. 2 shows a view taken along the line II—II of FIG. 1.
Figure 3:
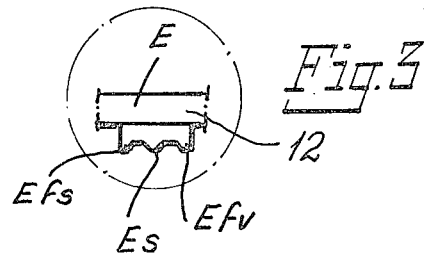
FIG. 3 shows an enlargement of the circumscribed portion of FIG. 2. The same reference numerals have been used in the various Figures wherever possible.

Transmitters A-E on the movable arm 12 may for example be connected to a computer control unit (not illustrated) which serves the purpose of determining the positions in which the robot arm is to be made to stop very precisely when the robot arm is being driven longitudinally. When the tool 13, which is illustrated as a hand mounted at the left end of the robot arm in FIG. 1, has performed its operation and the robot arm is to be displaced to another position this is done by the rapidly rotating motor 5 being provided with an actuating pulse from the computer control unit and thus beginning to rotate at its high speed of rotation and to drive gear belt 8, with block 10 and robot arm 4 also following along in the movement. It may now be assumed that robot arm 4 moves to the left and that the operative program of the robot is such, that transmitter E is actuated by the computer control unit. When sensor G then passes the point $E_{fy}$ (compare FIGS. 2 and 3) G will deliver a pre-signal which causes motor 5 to be deactivated and motor 6 and coupling 14 to be activated. Coupling 14 will now decelerate robot arm 4 so that the speed of the latter decreases to the speed determined by motor 6. The robot arm then continues to the left at its reduced speed, with sensor G reaching the point $E_s$ of transmitter E. Sensor G will then deliver a final signal which causes brake 11 to become actuated concurrently with motor 6 and coupling 14 being deactivated. Robot arm 4 has thereby reached the desired position rapidly and with a desired amount of deceleration. The last-mentioned deceleration is determined by means of coupling 14. Robot arm 4 is now clamped in its desired position by means of the substantial locking force provided by brake 11.

When the robot arm is to perform its next operation brake 11 is deactivated, whereafter the rapidly rotating motor 5 is actuated, whereupon the process described above is repeated and a pre-signal and a final signal from other transmitters A–D interacting with sensor G and the computer control unit are generated. Thus, in this manner the robot arm can be braked smoothly from its rapid motion and can be set to a precise final position at an arbitrary, desired place in its path of motion.

Sensor G can if desired and as illustrated be formed with a tip and transmitters A–E can each be provided with the three illustrated projections Efs, Es, Efv for interacting with said tip of the sensor, one of said projections, namely Es, being located essentially in a central position and the two others, Efs and Efv, respectively, being located substantially the same distances from said central position in opposite directions along the stationary arm.

The system also permits the robot arm to be programmed in such manner that it can find alternative positions, i.e. it can "jump". The reason for this is that it is desirable that a "happening" outside of the set program shall be capable of changing the portion of the program remaining after said happening. This is possible with a robot arm drive and a robot arm control, respectively, designed in the illustrated manner.

In order that the robot arm be made to stop in exactly the same position, regardless of whether it moves to the left or to the right, sensor G, which forwards the relevant signal, can be made to move along robot arm 4 in a movement corresponding to the physical extent of sensor G and the point Es on transmitter E or a corresponding sensor. Normally there is no possibility of achieving precise setting of the final position of a robot arm, completely irrespective of whether the robot arm moves from the left to the right or from the right to the left, in robot arms operating on the basis of the principle "point to point".

In practice, the transmitters which emit the pre-signals and final signals, respectively, can to advantage be disposed in layers or at different levels for instance on the stationary arm 12, and in this manner it is possible to achieve that desired stop positions of the robot arm in reality even can lie at the distance of zero from the preceding position.

The transmitters and sensors can consist of arbitrary cooperating signal means, and the feeding of one type (for example the transmitters) can be performed in an arbitrary appropriate manner, which also applies to the delivery of signals from the other type (the sensor as above).

The invention is not restricted to the embodiment described above and illustrated in the drawing, and this is merely an example of the invention and its mode of utilization. Thus, it is not necessary to utilize two motors, and instead these could be replaced by a single motor if the latter is provided with a transmission of such type that it can perform the same operation as the two motors described above. Furthermore, the coupling may be of an arbitrary appropriate type on the condition that the coupling can perform its task in the system, namely to decrease the energy level so as thereby to make it possible to determine the final position of the robot arm unitarily, even if the load varies as much as from for example 0 to 45 kilos. The coupling may for example be hydraulic or pneumatic, and it may be pressure controlled, which means that the braking process can be very smoothly and steplessly controllable.

Finally, it may be mentioned that it is possible to have an arbitrary number of sensors for the pre-signal and the final signal, respectively, and that the interval between for example the pre-signal for motion to the left (Efv) and the final signal (Es) and the pre-signal for motion to the right (Efs) and the final signal (Es), respectively, may be adjustable with respect to the relevant load (robot arm plus tool plus object).

What is claimed is:

1. Apparatus for producing rapid movement and smooth braking and a plurality of reproducible and precisely defined final positions of a movable robot arm, said apparatus comprising
   (a) a support arm,
   (b) a rapidly rotatable motor, said rapidly rotatable motor being carried by said support arm,
   (c) a first gear, said gear being connected to said rapidly rotatable motor,
   (d) a slowly rotatable motor, said slowly rotatable motor also being carried by said support arm,
   (e) a second gear,
   (f) a coupling, said second gear being connected to said slowly rotatable motor over said coupling,
   (g) a substantially elongate driving belt, said driving belt extending between said two gears,
   (h) a movable robot arm, said movable robot arm being attached to said driving belt and extending parallel thereto,
   (i) a stationary arm, said stationary arm extending substantially parallel to said robot arm and said driving belt, respectively,
   (j) a sensing member, said sensing member being disposed on said robot arm, and
   (k) a plurality of transmitting members, said transmitting members being disposed on said stationary arm for interacting with said sensing member.

2. Apparatus in accordance with claim 1, wherein said sensing member is provided with a point and said transmitting members each are provided with three projections for interacting with said point, one of said projections being located essentially in a central position and the two others being located substantially the same distances from said central position in opposite directions.

* * * * *